United States Patent [19]
Atalla et al.

[11] 3,938,091
[45] Feb. 10, 1976

[54] PERSONAL VERIFICATION SYSTEM

[75] Inventors: Martin M. Atalla, Portola Valley; Alexander F. Liu, San Jose, both of Calif.

[73] Assignee: Atalla Technovations Company, Sunnyvale, Calif.

[22] Filed: July 19, 1974

[21] Appl. No.: 490,179

Related U.S. Application Data

[63] Continuation of Ser. No. 235,641, March 17, 1972, abandoned.

[52] U.S. Cl. ...... 340/149 A; 340/152 R; 235/61.7 B
[51] Int. Cl.² .......................................... G06K 9/00
[58] Field of Search .................. 340/149 A, 152 R; 235/61.7 B, 61.6 R; 70/277; 179/2 DP

[56] References Cited
UNITED STATES PATENTS

| | | | |
|---|---|---|---|
| 3,457,391 | 7/1969 | Yamamoto | 235/61.6 R |
| 3,761,683 | 9/1973 | Rogers | 340/149 A X |
| 3,786,420 | 1/1974 | Stambler | 340/149 A |
| 3,794,813 | 2/1974 | Spetz | 340/149 A X |

*Primary Examiner*—Harold I. Pitts
*Attorney, Agent, or Firm*—A. C. Smith

[57] ABSTRACT

A customer code word issuing machine is provided wherein a customer manually inputs to the machine his secret password. The machine encodes the password and displays his corresponding issued code word. A verification machine is provided which includes a dial or keyboard for manually inputting the customer's password and the issued code word. The verification machine encodes the inputted password to derive an output for comparison with the manually inputted code word to derive an output indicative of the truth or falseness of the match of the code word with the respective password. The verification machine may be employed to open a lock, to allow use of a credit card for a telephone call, purchase of goods, etc.

7 Claims, 21 Drawing Figures

* SYNC KEYS CAN BE PICKED,
2 OUT IF 12 COMBINATION.
-ADDITIONAL PROGRAMMER

PERSONAL VERIFICATION SYSTEM

CROSS REFERENCE TO RELATED APPLICATION

This is a continuation of application Ser. No. 235,641, filed Mar. 17, 1972 now abandoned.

DESCRIPTION OF THE PRIOR ART

Heretofore, systems for identifying the bearer of an identification card have been provided wherein cryptographically encoded information on the card is compared to a randomly scrambled representation of a number privately known to the card bearer. Comparison is made by insertion of the identification card into a card reading means, and by manual insertion of the privately known number into a number receiving means such as a keyboard. The two numbers may be sent to a comparator on a digital basis. Should the comparison be exact the card holder will be positively identified. Such a system is disclosed and claimed in U.S. Pat. No. 3,609,690 issued Sept. 28, 1971 and another similar system for dispensing money from a bank is disclosed and claimed in U.S. Pat. No. 3,588,499 issued June 28, 1971.

The problem with these prior art personal verification systems is that they are relatively complex requiring a card reader to read a code number embossed or otherwise formed in a card. Card readers are relatively expensive devices. As a result, the prior systems have been too costly to implement, especially when a relatively large number of verifiers are required such as would be contemplated by widespread use of credit cards. That is, each merchant, filling station operator, or the like would be required to have a number of such units. Therefore, the cost of the prior art devices has heretofore been considered prohibitive.

SUMMARY OF THE PRESENT INVENTION

The principal object of the present invention is the provision of an improved personal verification system.

In one feature of the present invention, a code word issue machine is provided which includes means for manually inputting a first word to an encoder means to produce a second word corresponding to an encoded version of the first word. A display means is responsive to the output of the encoder for displaying the second or code word, whereby the customer may issue to himself the code number corresponding to this privately known and self devised password, such password being easily remembered because it is of his own choosing.

In another feature of the present invention, an encoder is provided which includes a number of programmable stages for changing the code of the encoder, whereby a universal encoder design may be readily programmed to provide any one of a number of different codes by merely inserting an appropriate programming plug into the encoder which hard wires the universal encoding circuit in a certain manner to provide a certain code. A number of such programming plugs may be readily inserted for changing the code of the encoder.

In another feature of the present invention, a verification machine is provided which includes means for manually inputting first and second words, one of said words purporting to be an encoded version of the other. The verification machine includes an encoder which encodes the inputted password and compares it with the inputted code word to derive an output determinative of the truth of a match between the two compared words.

In another feature of the present invention, a verification machine includes a common manual inputting means, such as a keyboard or dial, for inputting the password and the purported code word with signal routing means for routing one of the inputted code words around an encoder which receives the password, whereby a time share of the common input terminal is obtained with an attendant reduction in size and cost of the verification machine.

In another feature of the present invention, a verification machine employs a telephone as a manual inputting terminal which is connected over a telephone link to an encoder and comparator portion of the verification machine at a remote location, whereby long distance verification is obtainable utilizing existing equipment.

In another feature of the present invention, a telephone credit card call is verified by having the subscriber input over the telephone to a central verifying machine his telephone number, password and code word. At the central verifier, the telephone number and password are encoded and the code word is compared with the encoded words to derive an output determinative of the truth or falsity of the match of the compared words. A truth output, in one embodiment, is employed for completing a circuit to enable the subscriber to dial his call.

In another feature of the present invention, the output of a verification machine of the present invention is employed for releasing a lock to permit access to a secure area or region upon proper verification of a manually inputted password and code word.

In another feature of the present invention, a recorder is provided in conjunction with a verifying machine of the present invention for recording the code word of a successful verification such that a log is obtained of those persons obtaining verification of a password and code word.

Other features and advantages of the present invention will become apparent upon a perusal of the following specification taken in connection with the accompanying drawings wherein:

DESCRIPTION OF THE PREFERRED EMBODIMENTS

Figure 1:
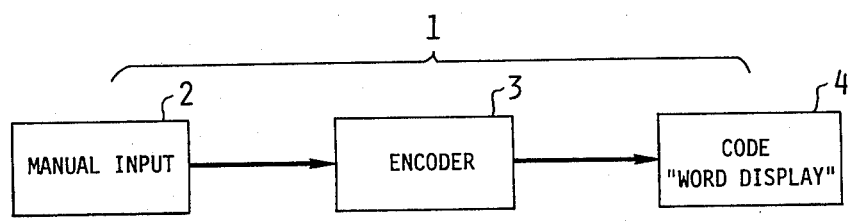
FIG. 1 is a schematic block diagram of a code word issuing machine of the present invention.

Referring now to FIG. 1, there is shown, in schematic block diagram form, the code word issue machine 1 of the present invention to be employed in the personal verification system of the present invention. The code word issue machine 1 includes a manual input terminal 2, such as a keyboard, telephone dial or the like. The person, wishing to have issued to himself a code word in acccordance with his preconceived secret password, manually inputs the password on the keyboard 2. The password is fed to the input of an encoder 3 which encodes the password into an output coded word which is fed to a code word display 4. Thus, in its simplest terms, the code word issue machine 1 includes means for manually inputting a first word to produce a code word input corresponding to the inputted word.

As used herein, the terms "word" and "number" are interchangeable and the word or number may include all numerical characters, all alphabetic characters or a mixture of alphabetic and numeric characters. Also the term "encoder" may be interchanged with the term "decoder" since all that is required in the code word issue machine 1 is that there be a first word related to a second word or output word by means of a code. Either the first or second word may be employed as a secret password to be matched with the other word through the intermediary of a code.

Figure 2:
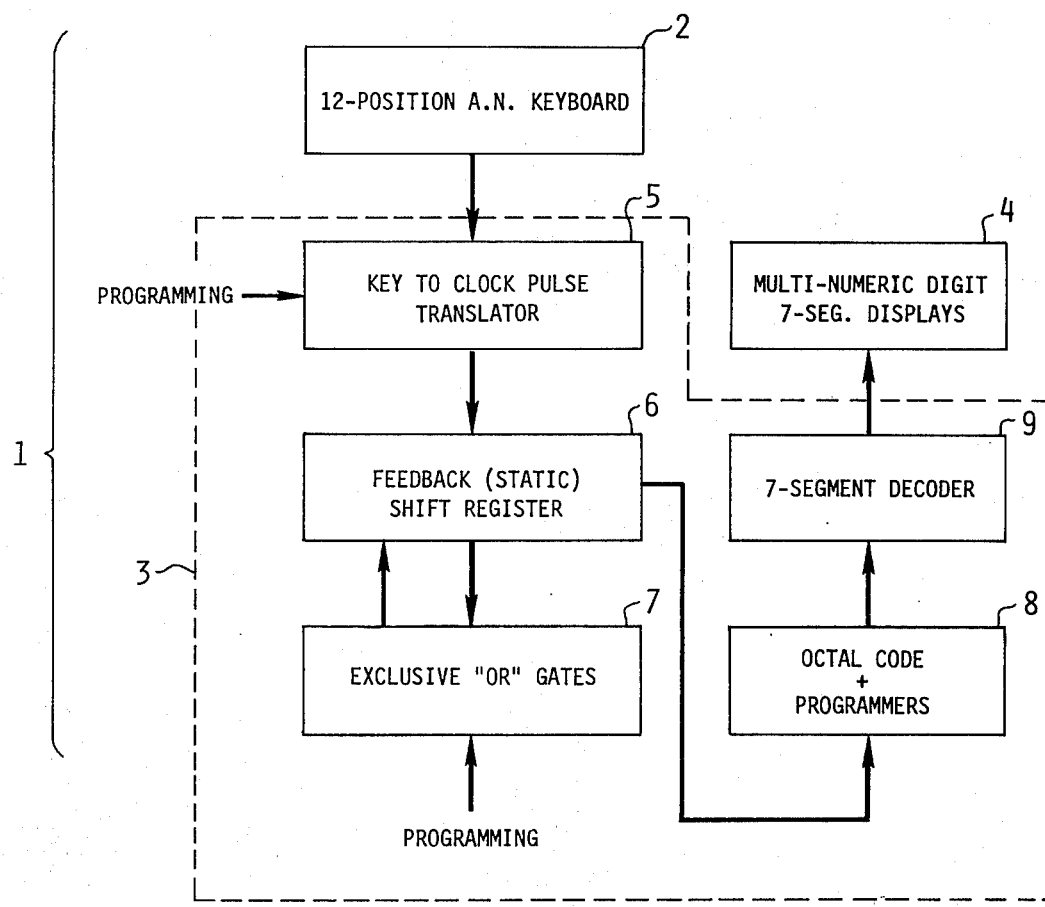
FIG. 2 is a more detailed schematic block diagram of the issuing machine of FIG. 1.
Figure 3:
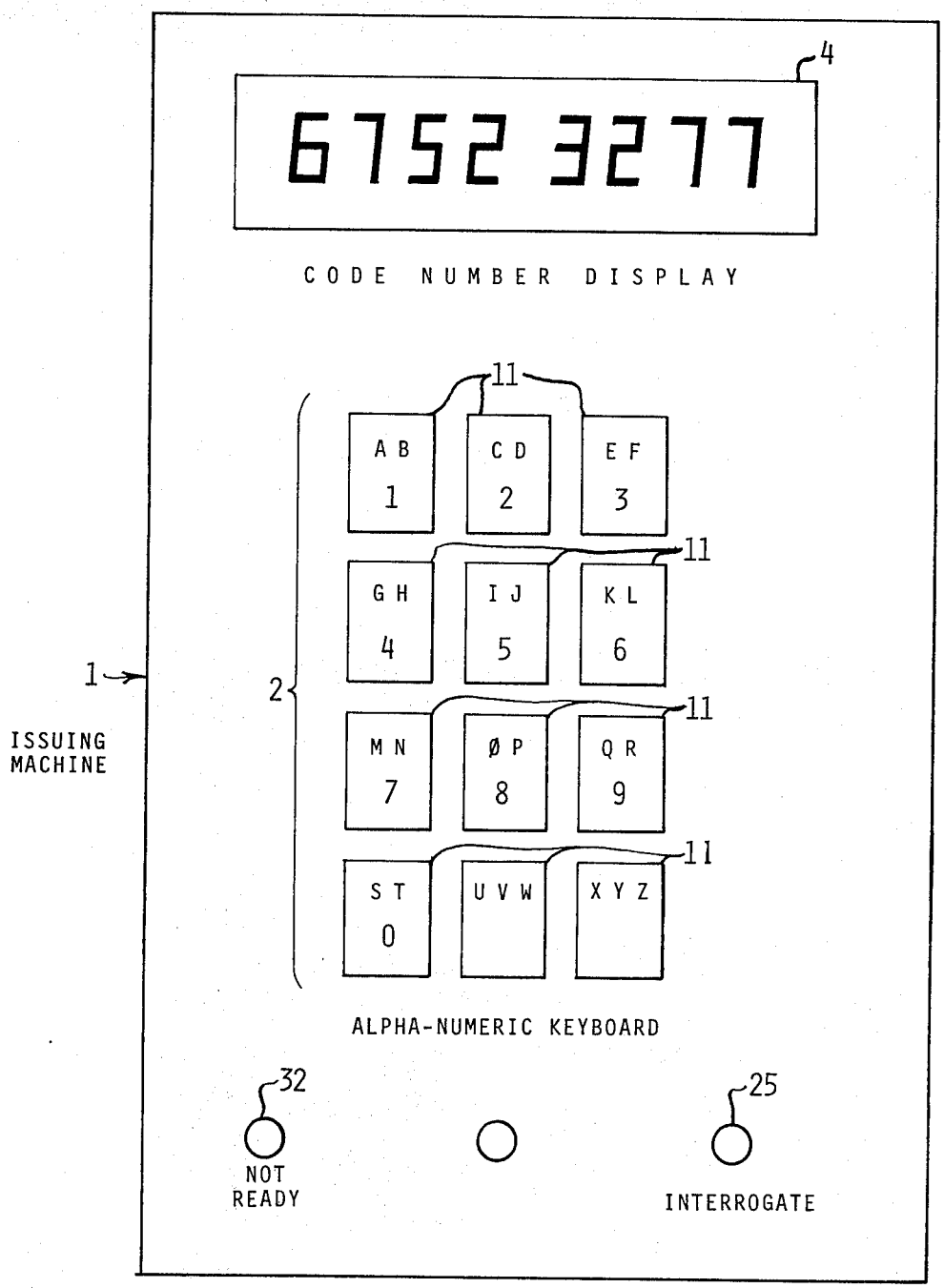
FIG. 3 is a plan view of the housing of a code issuing machine of the present invention.

Referring now to FIG. 2, there is shown in greater detail a functional block diagram of a preferred embodiment of a code word issue machine 1. In this embodiment, the manual input terminal 2 includes a 12 key alpha-numeric keyboard 2, such as a Chromeric's Model ER20070 keyboard. The keyboard 2 preferably has an alphanumeric format as shown in FIG. 3. By grouping two letters and one numeral on each of the first 10 keys, and by grouping three letters on each of the 11th and 12th keys, all of the letters of the alphabet and ten numerals may be accommodated on 12 keys.

The output of the alpha-numeric keyboard 2 is fed to a key-to-clock pulse translator 5 for generating a train of pulses. Each pulse train having a different predetermined number of pulses corresponding to a respective different one of each of the 12 keys of the keyboard. The output of the key-to-clock pulse translator 5 is fed to the input of a 24 bit feedback static shift register 6. The feedback shift register 6 is programmed by a plurality of exclusive OR gates 7 for generating a 24 bit output in response to each of the inputted characters. Each of the characters inputted to the feedback shift register 6 causes the state of the shift register 6 to be shifted by the predetermined number of positions according to the number of pulses inputted for the corresponding key.

After the word has been completely inputted to the shift register 6, the output state of the feedback shift register 6 is read-out to a multi-numeric digit 7-segment display via the intermediary of an octal-code programmer 8 and a 7-segment decoder 9. The decoder 9 decodes the octal-code to 7-segment code for display by the multi-numeric display 4.

Figure 5A:
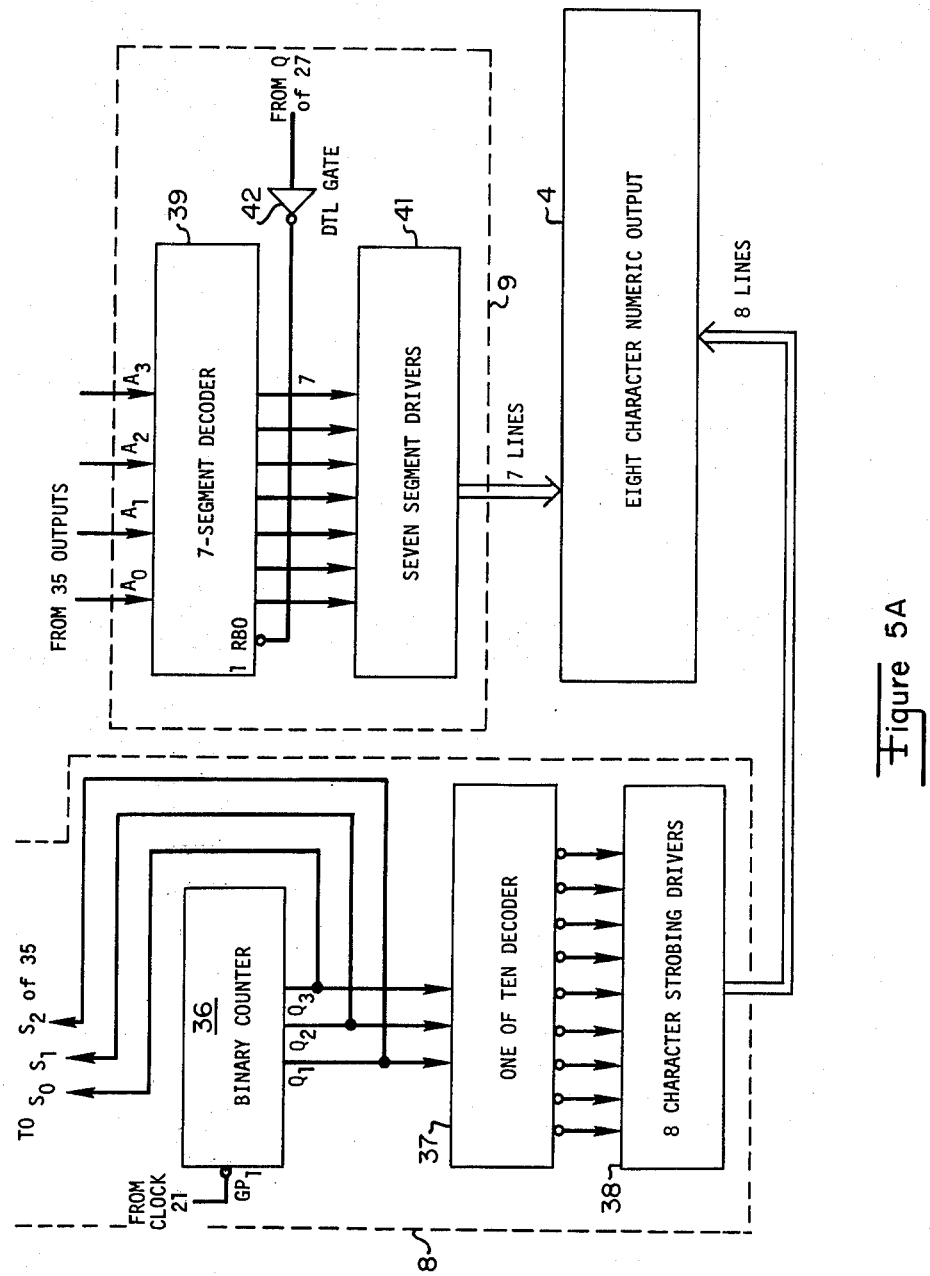

Referring now to FIG. 5a and b there is shown a simplified logic functional block diagram for the code issue machine 1. The individual keys 11 of the keyboard 2 are individually connectable to a grounded bus 12 by depressing or actuating the key. One output from each of the keys 11 is fed to the corresponding input of an NAND gate 13 for generating an output which triggers a one-shot 14 to produce a negative pulse on line 15. Each of the individual keys 11 is also connected to a corresponding input of a 12-bit latch 16, such 12-bit latch 16 being formed, for example, by three model 9322 integrated circuits. Thus, whenever a key 11 is depressed, one of the lines connected with the key provides a 0 (low) signal to both the 12-bit latch 16 and the NAND gate 13.

The output of the NAND gate 13 fires the one-shot 14 to generate a negative going pulse to the parallel enable input 15 of a 12-bit UP binary counter 17 to load the twelve bit latch contents into the 12-bit UP binary counter 17. Initially, the 12-bit UP binary counter 17 is resting at an all 1 state, i.e. the terminal count output is a "high" which when inverted through an inverter 18 provides a "low" to the count enable pulse input terminal of the 12-bit binary counter 17 to disable the binary counter 17. The binary counter 17 comprises, for example, three model 9316 integrated circuits.

As soon as a key 11 is depressed, a set of twelve bits is loaded from the latch 16 into the binary counter 17 and the terminal count on the binary counter 17 drops to a low which when inverted by inverter 18 produces a high count enable pulse causing the binary counter 17 to count from the loaded state up to an all 1 state which makes the terminal count high. The high is inverted by inverter 18 to a low which disables the binary counter 17 to terminate the counting function. Thus, the output of the inverter 18 is a high pulse of a duration corresponding to the time it takes the binary counter 17 to count clock pulses from the state loaded into the binary counter to a terminal all 1 state. Thus, the operating time of the counter 17 is a function of the bit state loaded into the binary counter 17, which in turn depends upon which one of the individual key 11 was depressed.

The output of the inverter 18 is also fed to one input of a NAND gate 19 to which the output of the clock generator 21 is also connected. Thus, the NAND gate 19 serves to gate the clock pulses to the input of a 24-bit shift register 22. The number of clock pulses which are gated to the shift register 22 is dependent upon the duration of the count of the binary counter 17. The 24-bit shift register 22 may comprise, for example, six model 9300 integrated circuits.

Thus, the NAND gate 13, one-shot 14, latch 16, binary counter 17, clock generator 21, inverter 18 and gate 19 serves to form the key-to-clock pulse translator 5 as described above with regard to FIG. 2. The output of the key-to-clock pulse translator 5 is a train of pulses with the number of pulses in each train corresponding to the particular key actuated on the alpha-numeric keyboard 2.

A plurality of exclusive OR gates 23 are hard wired into the 24-bit shift register 22 in the conventional manner to provide a plurality of feedback paths to the input of the 24-bit feedback shift register 22 for pseudo-randomizing the states of the register 22. The 24-bit shift register 22 is initialized to an all 0 starting state by depressing an interrogate switch 25 (see FIG. 3) which grounds the input of a one-shot multi-vibrator 26, which in turn toggles a flip-flop 27. The Q output of flip-flop 27 is toggled from a low to a "high". The "high" fires a second one-shot multi-vibrator 28, the negative output pulse of which is fed to the MR terminal of the shift register 22 to reset the shift register 22 to an all 0 state.

The $\bar{Q}$ corresponding low output of the flip-flop 27 is connected via lead 31 to the high side of a light emitting diode 32 for grounding the high side of the light emitting diode 32, thereby extinguishing the diode 32 which is a NOT READY indicator on the front panel of the issue machine 1 (see FIG. 3). Thus, when the NOT READY light is extinguished this gives a ready indication to the customer or operator to start entering his password on the keyboard 2.

As the individual keys 11 are depressed the corresponding numbers of pulses are generated and fed to the 24-bit shift register 22 for encoding. Thus, upon entering all the letters of the password the 24-bit shift register 22 will be in a final state corresponding to the encoded version of the particular password that has been entered.

The output of the 24-bit shift register 22 is wired into the input of a 24-bit input multiplexer 35 by means of a hard wire program that may be changed as desired, as more fully described below. In a typical example, the 24-bit input multiplexer 35 comprises three model 9312 integrated circuits. An output of the clock generator 21 is fed to one input a binary counter 36, such as a model 9356 I.C. for generating three binary outputs on terminals Q1, Q2 & Q3. The three outputs of the binary counter 36 are fed to the three control input terminals of the multiplexer 35. The three outputs of the binary counter 36 are also fed to the input of a one-of-10 decoder 37, such as a 9301 integrated circuit. Eight of the outputs of the one-of-10 decoder 37 are fed to an eight character strobing driver 38 which serves to drive the eight character numeric display 4.

The output of the 24-bit shift register 22 is grouped into eight octal number three bit groups wherein each octal number is derived from each three bit group output of the shift register 22. There are a minimum of 6,072 combinations available. Each different combination can be implemented as one unique code. The three bit octal code group output of shift register 22 and multiplexer 35 is adapted to eliminate any ambiguity in a 7-segment numerical display 4. The digit octal code groups are multiplexed to a 7-segment decoder 39 from the output of the twenty four input multiplexer 35. The output of the 7-segment decoder 39 is fed to the input of a 7-segment driver 41 such as a 9307 integrated circuit. And the output of the 7-segment driver 41 is fed to the input of the eight character numeric display 4.

When the interrogate switch 25 was initially operated to extinguish the NOT READY light 32 and to reset the 24-bit shift register 22 to an all 0 state, a high output from the flip-flop 27 was fed through an inverter 42 to the RBO control terminal of the 7-segment decoder 39 to disable the decoder and to disable the eight character numeric display 4 during the time the operator is inputting the password into the 24-bit shift register 22.

After the password has been inputted, the operator again actuates the interrogate switch 25 which energizes the one-shot 26 to change the state of the flip-flop 27 to a low on terminal Q and a high on terminal $\bar{Q}$. The high on terminal $\bar{Q}$ energizes the NOT READY light. The low on terminal Q is passed through the invertor 42 to the RBO input of the 7-segment decoder 39 thereby enabling the decoder 39 to cause the output of the multiplexer 35 to be strobed by the binary counter 35 into the eight character numeric display 4 for displaying the code word corresponding to the inputted password.

After the password has been issued or read from the display 4, the interrogate switch 25 is again actuated which causes the flip-flop 27 to shift to a high on terminal Q and a low on terminal $\bar{Q}$, thereby turning out the NOT READY light 32 and resetting the shift register 22 to all 0's. Code issue machine 1 is then again in a condition to have a new password inputted to the keyboard 2.

Figure 4:
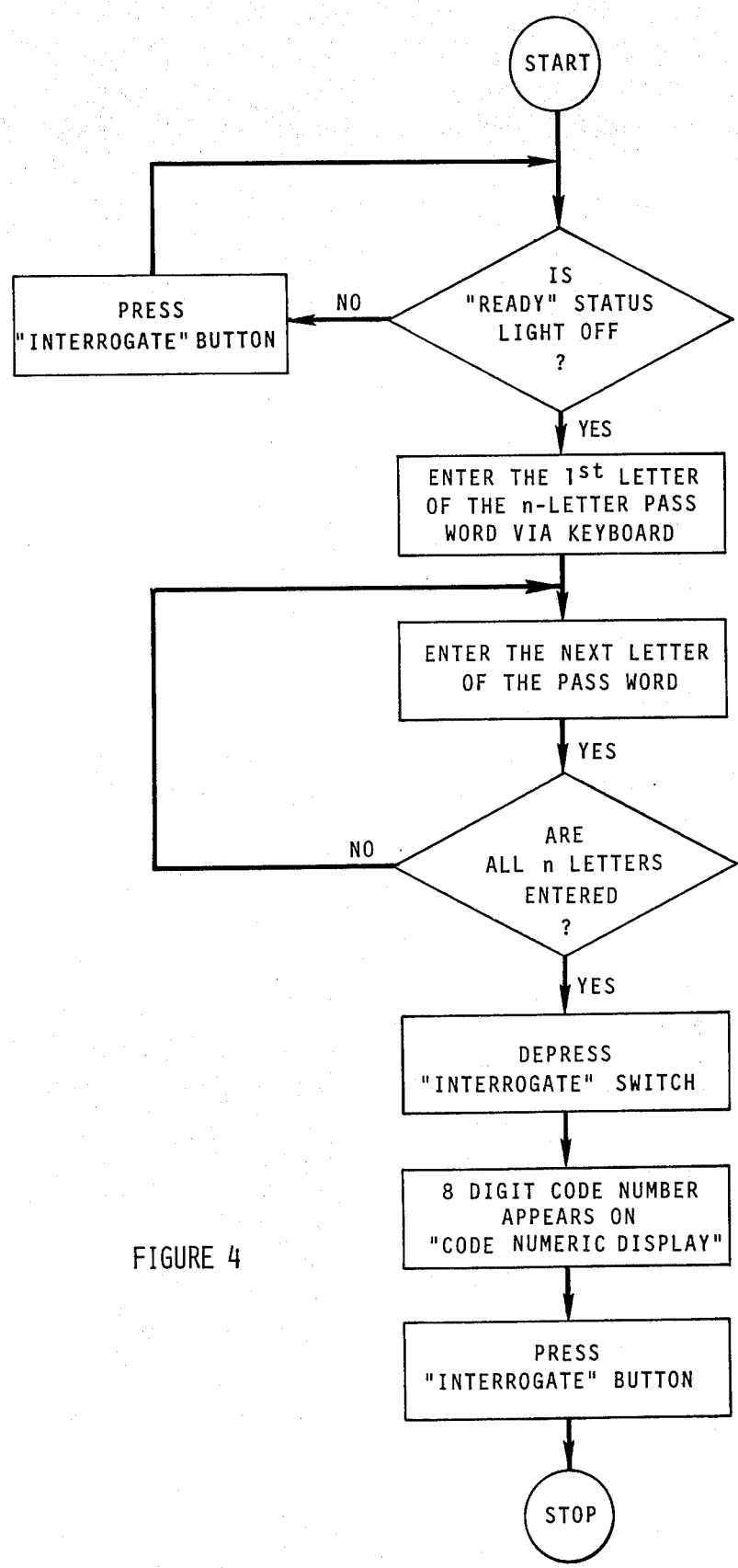
FIG. 4 is a logic flow chart for the code word issue machine of FIGS. 1–3, FIGS. 5a and 5b are a simplified circuit diagram, partly in block diagram form, depicting the logic circuitry of the code word issue machine of FIGS. 1–4.
Figure 5B:
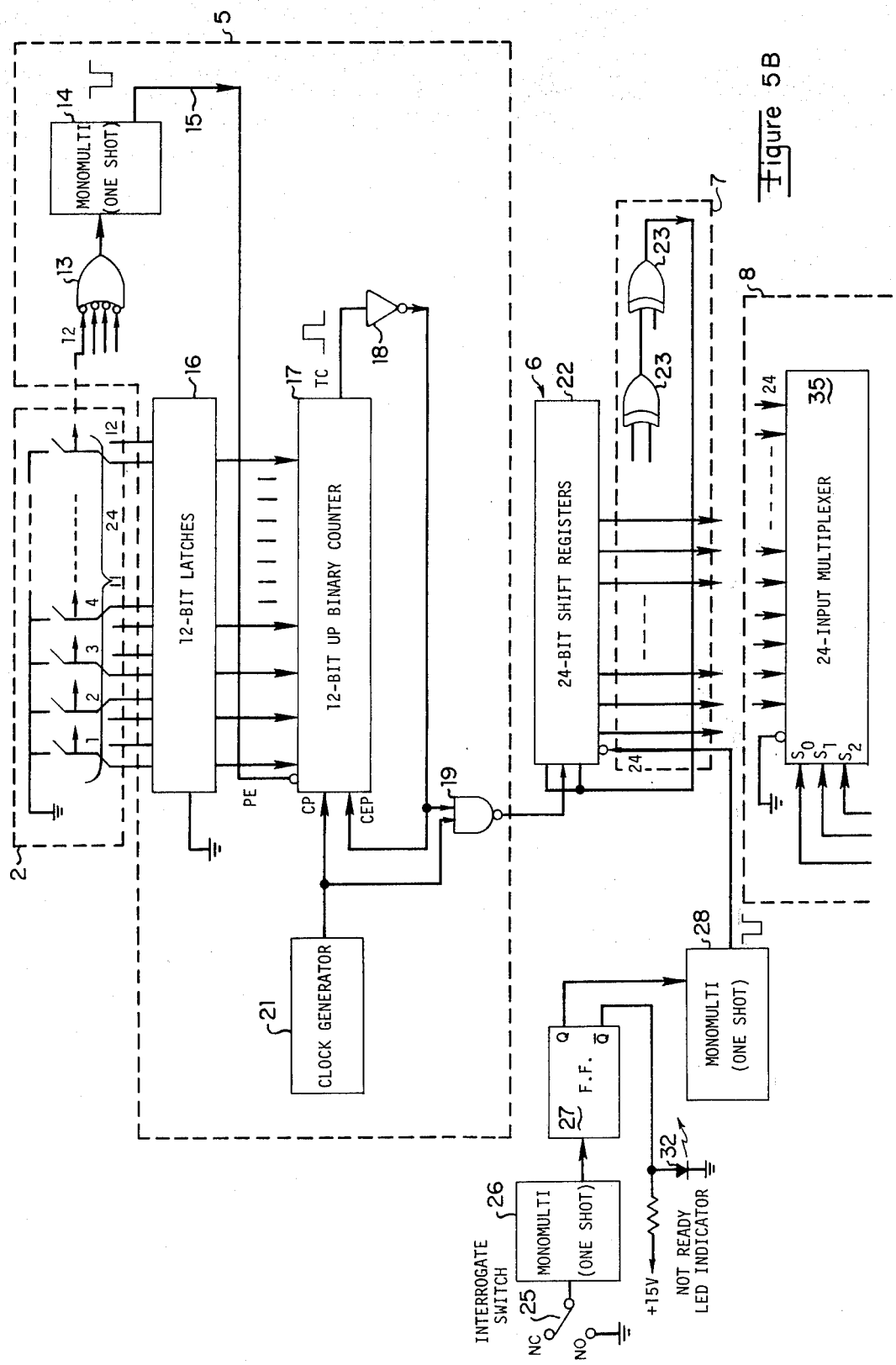

There are a number of places in the encoder circuitry of FIG. 5 where insertion of a programming plug will serve to hard wire different elements together in a different pattern to result in changing the code of the encoder. More particularly, such a programming plug may be inserted between the 12-bit latch 16 and the 12-bit UP binary counter 17 to effectuate a change in the code of the encoder. A second place where a programming plug may be inserted for changing the code is in the hard wire program between the 24-bit shift register 22 and the 24-bit input multiplexer 35. The code may also be changed by a programming plug inserted between the 24-bit shift register 22 and the exclusive OR gates 23 for changing the connections therebetween and the program of the feedback shift register 22. The program of the encoder may also be changed by a programming plug inserted between the multiplexer 35 and the 7-segment decoder 39 or between the 7-segment decoder 39 and the 7-segment driver 41. Thus, it is seen that the code of the encoder of FIG. 5 may be changed by substitution of a different programming plug serving to change the hard wire connections at five different stages in the encoder. A logic flow chart for the code word issue machine of FIG. 5 is shown in FIG. 4.

Figure 6:
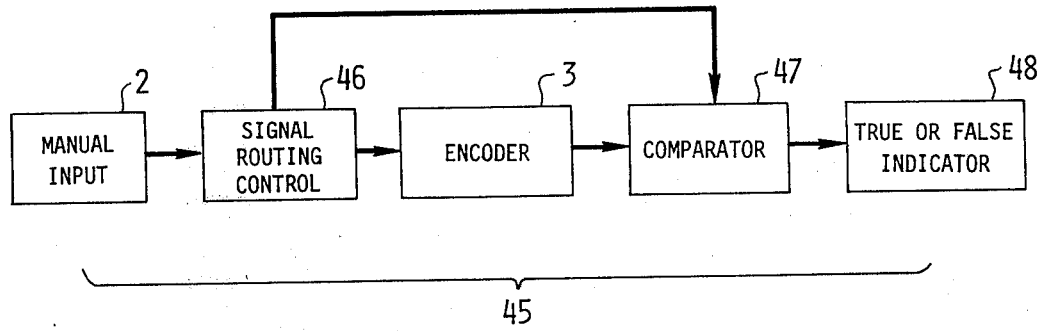
FIG. 6 is a schematic block diagram of a verification machine of the present invention.

Referring now to FIG. 6, there is shown a verification machine 45 incorporating features of the present invention. The verification machine 45 includes a manual input terminal 2 the output of which is fed to a signal routing control 46 for routing the manually inputted password to the encoder 3 to derive a corresponding code word. The actually encoded code word is fed to one input of a comparator 47 for comparison with the manually inputted code word routed by signal routing control 46 around the encoder 3 to the other input of the comparator 47.

In the comparator 47, the code word is compared with the encoded password to derive an output indicative of the truth or falsity of the match between the password and the purported code word. The truth output of comparator 47 is fed to a true or false indicator 48, thereby verifying or not verifying that the operator is in possession of a valid password and corresponding code word.

Figure 7:
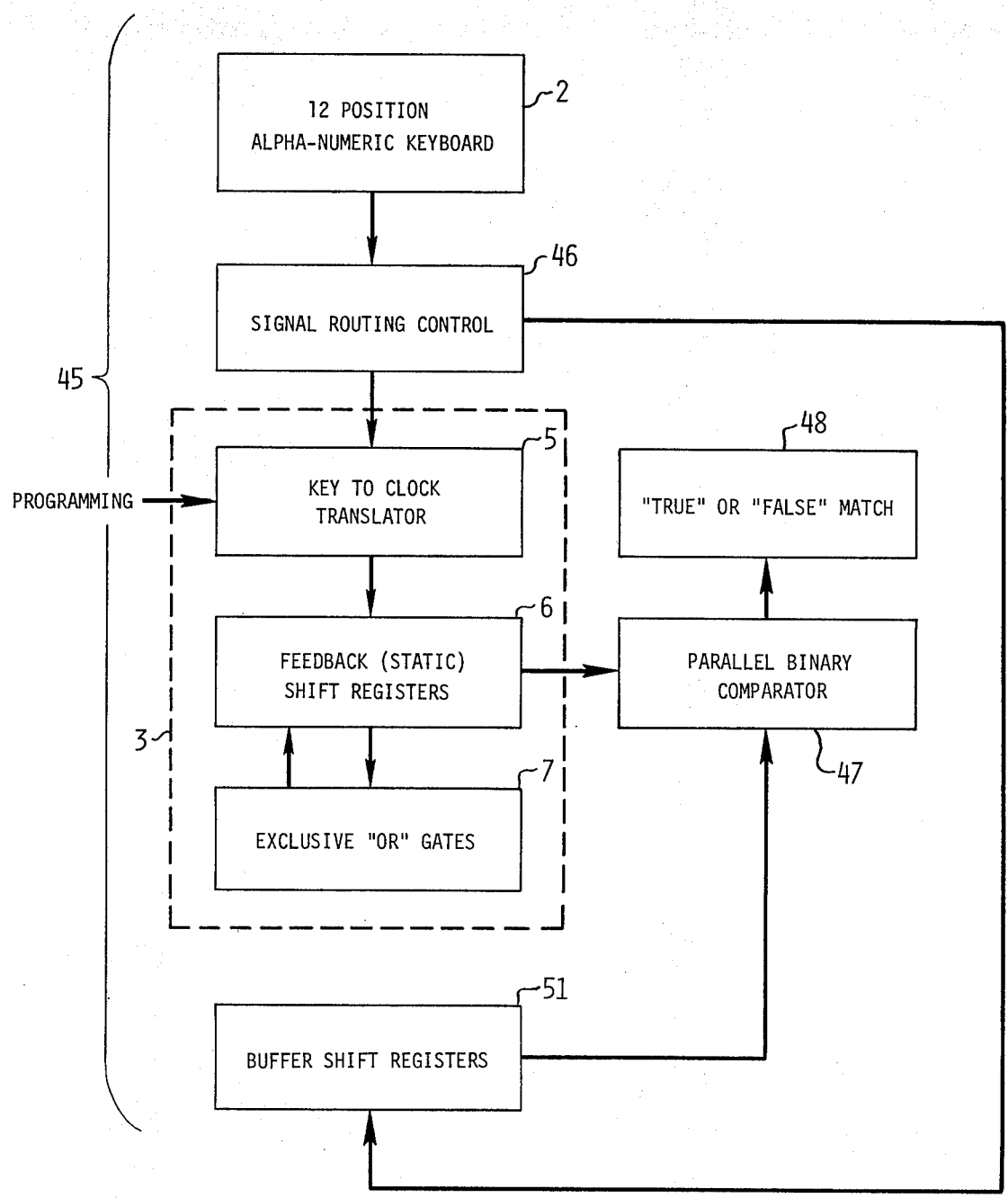
FIG. 7 is a schematic block diagram of the verifying machine of FIG. 6 but shown in more detail.

Referring now to FIG. 7, there is shown a block diagram similar to that of FIG. 6 but in slightly greater detail. Verifier machine 45 is similar in many respects to the code word issue machine 1 of FIG. 2. More particularly, the same identifying numbers have ben employed to identify the same elements in both machines. Thus, the output of the twelve position alphanumeric keyboard 2 is fed to the signal routing control 46. When the password is being manually inputted the signal routing control 46 feeds the password to the key-to-clock pulse translator 5 for generating a train of pulses. Each pulse train has a certain number of pulses corresponding to the particular key 11 actuated on the keyboard 2. The pulse trains are thence fed to the input of a feedback shift register 6 programmed by exclusive OR gates 7, as previously described in the encoder of FIG. 2.

After the password has been inputted into the feedback shift register 6, the interrogate switch 25 is depressed to change the signal routing control 46 for routing the next code word into a buffer shift register 51. After the code word has been inputted into the buffer shift register 51, the interrogate switch 25 is again actuated to energize a parallel binary comparator 47 for comparing the state of the feedback shift register 6 with the state of the buffer shift register 51. If the states in the registers 6 and 51 are identical, the output of the comparator 47 is a "true" match which actuates the "true" portion of the "true" or "false" indicator 48. However, if the output of the comparator 47 is a false match the false portion of the true or false indicator 48 is activated.

Figure 10A:
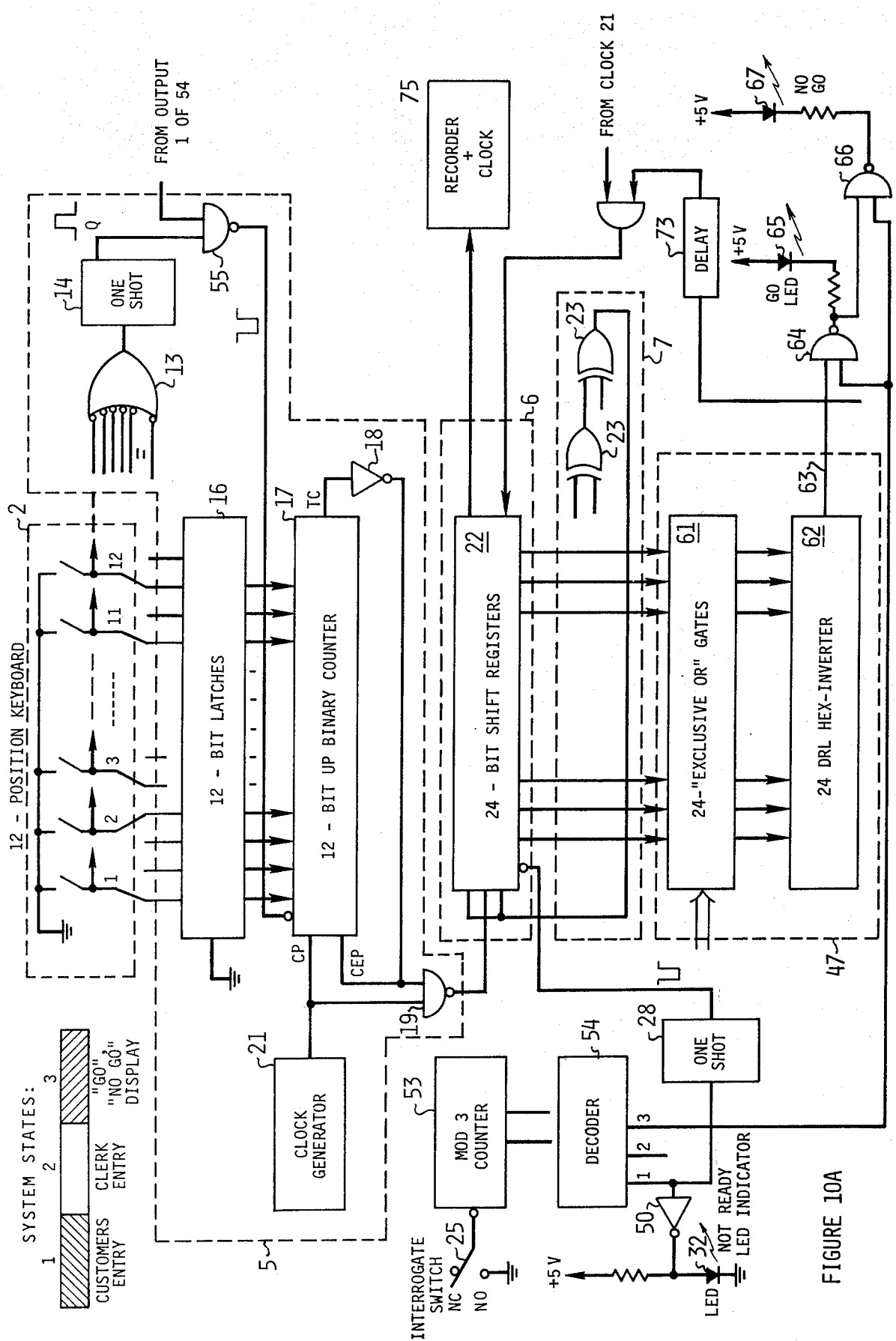
FIGS. 10a and 10b are a simplified logic circuit diagram, partly in block diagram form, for the verification machine of FIGS. 6–9.
Figure 10B:
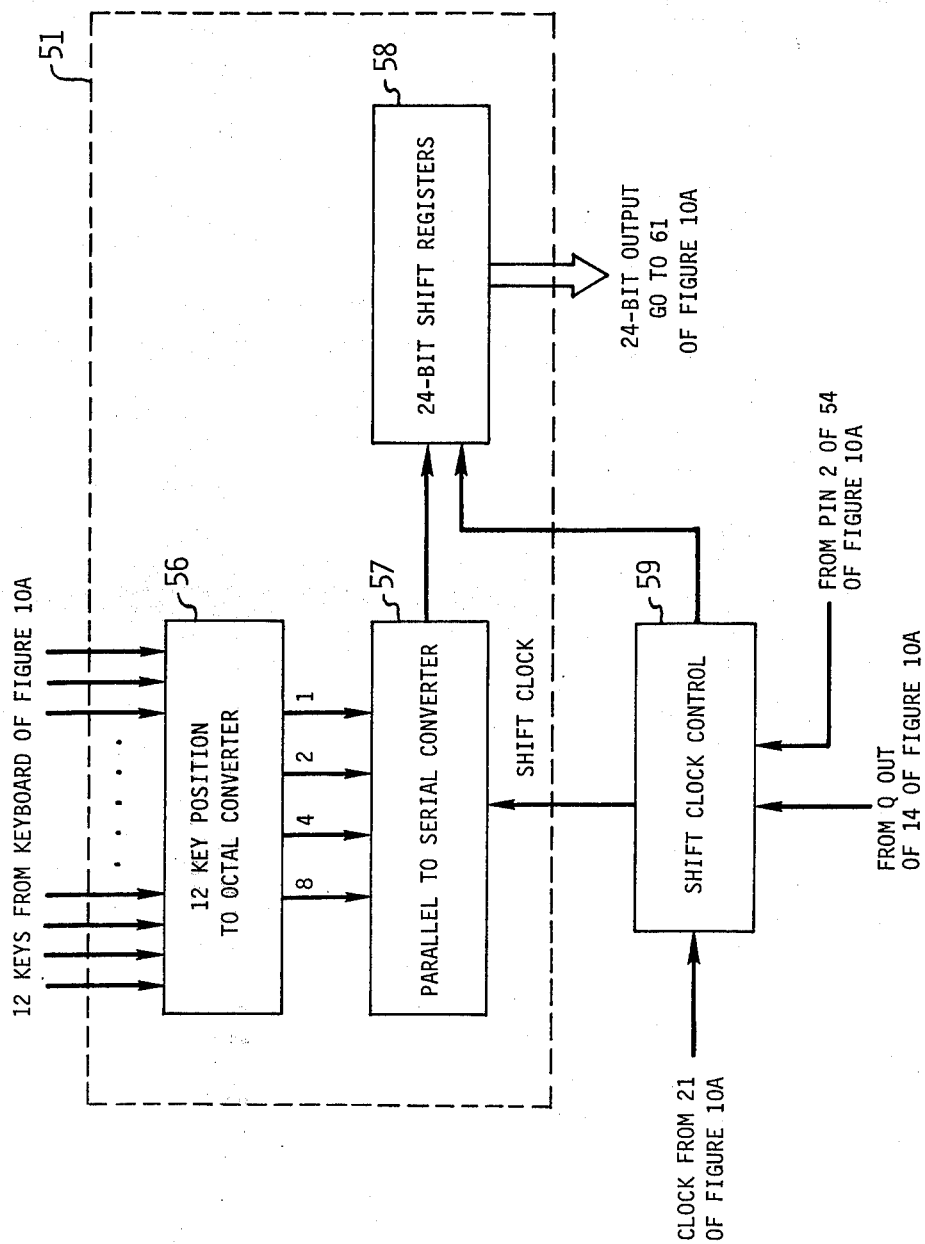

Referring now to FIG. 10, there is shown a simplified logic block diagram for the verifier machine 45 of the present invention. The verifier machine 45 is similar in many respects to the code word issue machine 1, as previously describe with regard to FIG. 5. The same reference numerals have been employed for identifying similar portions of the two circuits. Thus, the verifier machine 45 includes the 12-position input keyboard 2 and the key-to-clock pulse translator 5. The output of translator 5 is fed to the feedback shift register 6 which is programmed by a number of exclusive OR gates 7.

The verifier machine 45 includes three operating system states. A "customer entry" state, a "clerk entry" state, and a "go", "no-go" display state. The interrogator switch 25 is utilized to toggle the state of the verifier machine 45 from one state to the next by successively depressing the single interrogate switch 25.

A mode 3 counter 53 is connected to the output of the interrogator switch 25 such that upon each depression or actuation of the interrogate switch 25 the mode 3 counter 53 counts to the next higher state. In the first state, the output of the mode 3 counter 53 is fed to the input of a decoder 54 which decodes the binary input from the counter 53 to actuate the first output line of the decoder with a low for extinguishing the NOT READY light emitting diode indicator 32.

A 1 output from the first output line of the decoder 54 is also fed to a gate 55 in the key-to-clock pulse translator 5 for gating the output of the latches 16 into the 12-bit UP binary counter 17. Thus, in the first operating state (customer entry mode), actuation of the keys 11 causes the corresponding password to be entered into the feedback shift register 6, as previously described with regard to FIG. 5.

After the customer has entered his password, he depresses the interrogate switch 25 to cause the counter 53 to count to the next higher count and the decoder 54 to decode that count for actuation of the second output line to put the verifier in the second or clerk entry operating state. This state also produces a low on the first output line of the decoder 54 which when inverted by inverter 50 excites the NOT READY indicator light 32 and disables the translator gate 55 such that keying of the keyboard does not transfer information into the feedback shift register 6.

Each of the keys 11 of the keyboard 2 is also connected to a respective input of a 12 key position-to-octal converter 56 (see FIG. 10b), such as a model 9318 integrated circuit. The three outputs of the 12 key position-to-octal converter 56 are fed to the input of a parallel-to-serial converter 57, such as a model 9300 integrated circuit. The parallel-to-serial converter 57 is also connected to a 20-bit shift register 58, such as five additional model 9300 integrated circuits. Thus, the parallel-to-serial converter 57 and the 20-bit shift register 58, when connected in this manner, form a complete 24-bit shift register.

A shift clock control 59 has its output connected to a control input of the parallel-to-serial converter 57 and of the 20-bit shift register 58. In this manner each three bit word entered into the parallel-to-serial converter 57, upon actuation of the clock control, shifts the contents three bits to the right to receive the next three bit word.

The three bit shift control 59 employs one input from the second output line of the decoder 54 and a third input from the output of the one-shot multivibrator 14 in the key-to-clock pulse translator 5. Thus, upon actuation of a key 11, when the system operating state is in the clerk entry mode each depression of a key 11 causes the corresponding coded output from the octal converter 56 to be fed into the bottom of the 24-bit shift register formed by the connection of the parallel-to-serial converter 57 and the 20-bit shift register 58. Thus, each of the clerk keyed input characters is successively fed into the 24-bit shift register 51.

After the clerk has entered the code word, the clerk depresses the interrogate switch 25 causing the module 3 counter 53 to shift to the next count which is decoded by decoder 54 for actuation of the third output line of the decoder 54 with a high such that the state on line 3 is changed from a low to a high.

Figure 8:
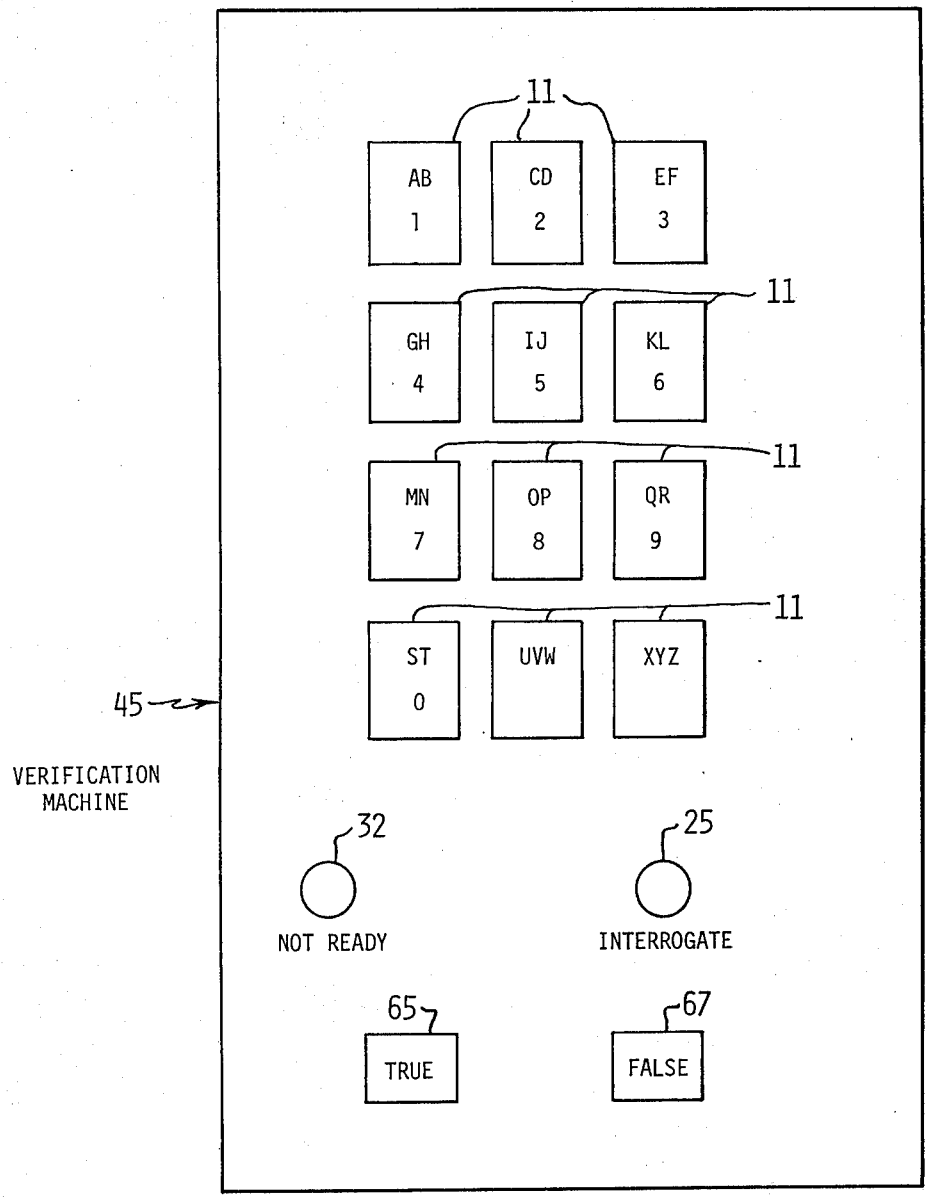
FIG. 8 is a plant view of the housing of a verifying machine of FIGS. 6 and 7.
Figure 11:
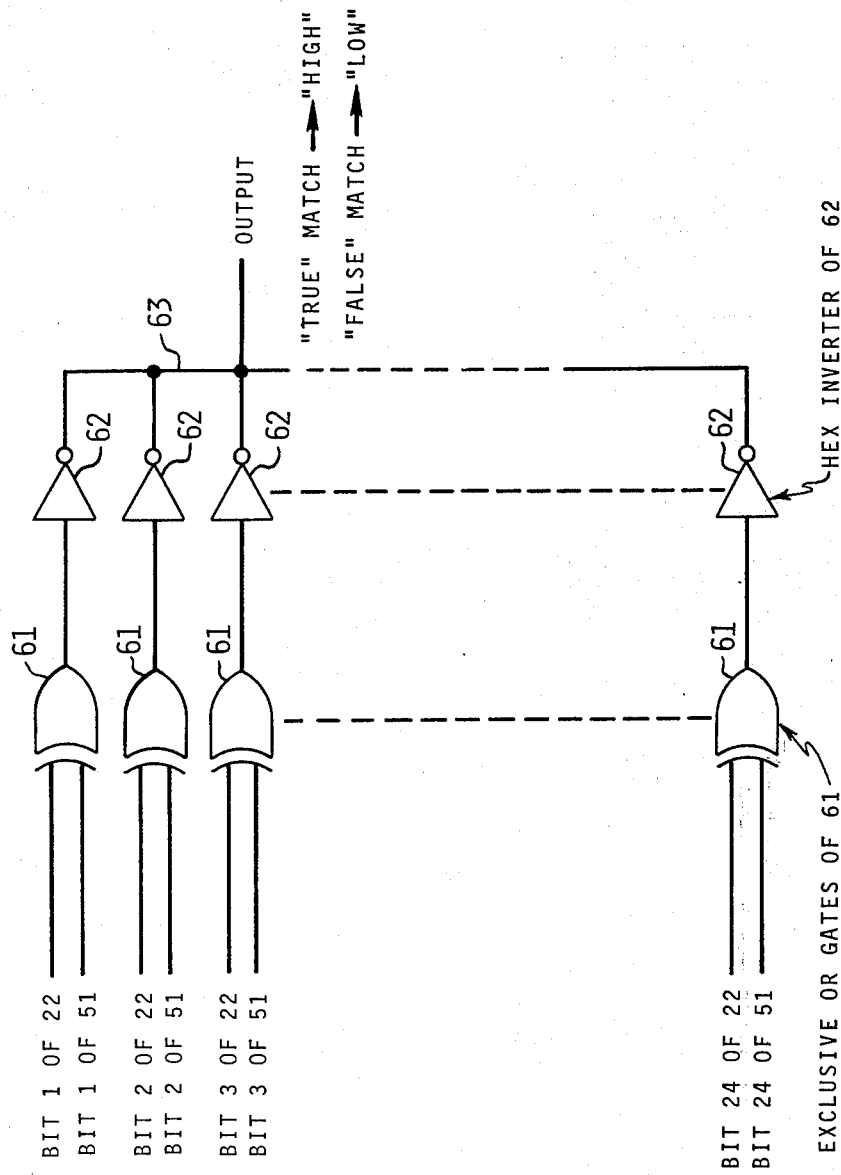
FIG. 11 is a schematic diagram for the comparator circuit of FIG. 10.

The 24-bit encoded password state of the feedback shift register 22 is connected to one input of a 24-bit array of exclusive OR gates 61 within the parallel comparator 47. The array of 24 exclusive OR gates 61 is shown in FIG. 11. Also, respective outputs of the 24-bit buffer shift register 51 are also fed to the other input of the 24-bit arrayed exclusive OR gates 61. The exclusive OR gates 61 are arranged so that the first bit from each of the 24-bit shift registers 22 and 41, respectively, are compared in the first exclusive OR gate and the second corresponding bits from each of the shift registers is compared in the second exclusive OR gate, and so forth. When the two inputs to each of the corresponding OR gates are the same, then the output for a "truth" match at output of the respective exclusive OR gates is a low. The output of each of the exclusive OR gates 61 is fed through a respective hex inverter 62 and thence to a common bus 63. If there is exact correspondence between every bit in the 24-bit shift register 22 and the 24-bit buffer shift register 51, all of the outputs of the exclusive OR gates will be low to produce a high truth output on but 63 which is thence fed to a NAND gate 64 which produces a low output for actuation of the go light emitting diode 65, thereby energizing the true indicator light 65 on the face of the verification machine 45 of FIG. 8.

The low output of NAND gate 64 is also fed to a second NAND gate 66 for comparison with the low output on line three of the decoder 54 to produce a high output at gate 66 which causes a second light emitting diode 67, indicative of a false, to be extinguished. False indicator light 67 is also shown on the face of the verification machine 45 (see FIG. 8).

If the output of any one of the exclusive OR gates is high, this is inverted by the corresponding hex inverter 62 as a low for grounding the output bus 63 to produce a low thereon. A low on bus 63 is converted by the first NAND gate 64 to a high which causes the true light emitting diode 65 to be extinguished and the high output of NAND gate 64 is thence fed to the input of the second NAND gate 66 which when compared with the other low input from the third state of the decoder 54 produces a low for lighting the false light emitting diode 67.

Figure 9:
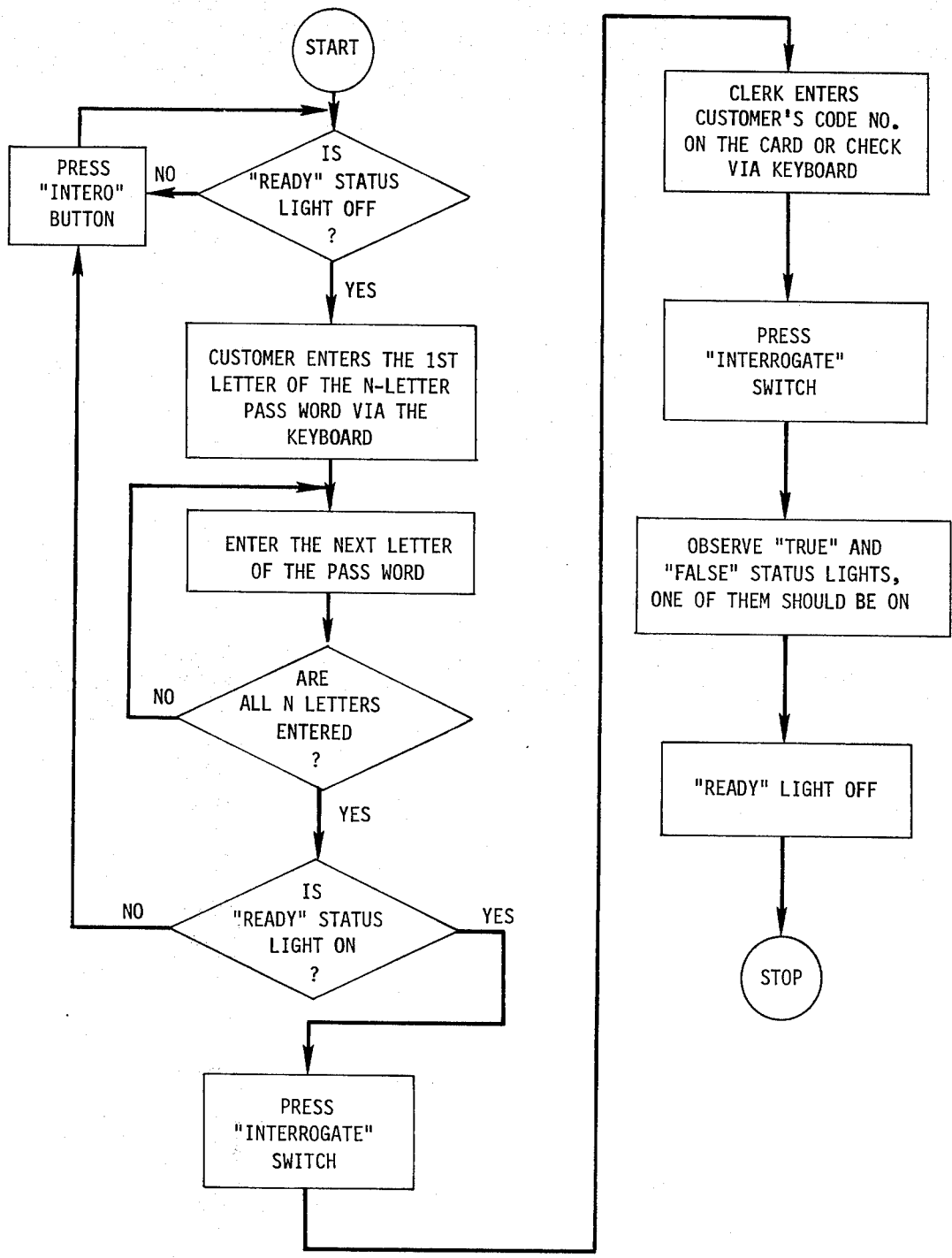
FIG. 9 is a logic program flow diagram for the verifying machine of FIGS. 6–8.

After the true or false indication has been obtained, the operator depresses the interrogate switch 25 which shifts the module 3 counter 53 by one step which is decoded by decoder 54 and changes the third output line to a low and the first output line to a 1 to extinguish the NOT READY light 32 and to actuate the one-shot multivibrator 28 which resets the password shift register 22 for all 0's. The verification machine is now back to the customer entry state. A program logic flow chart for the verification machine is shown in FIG. 9.

Figure 12:
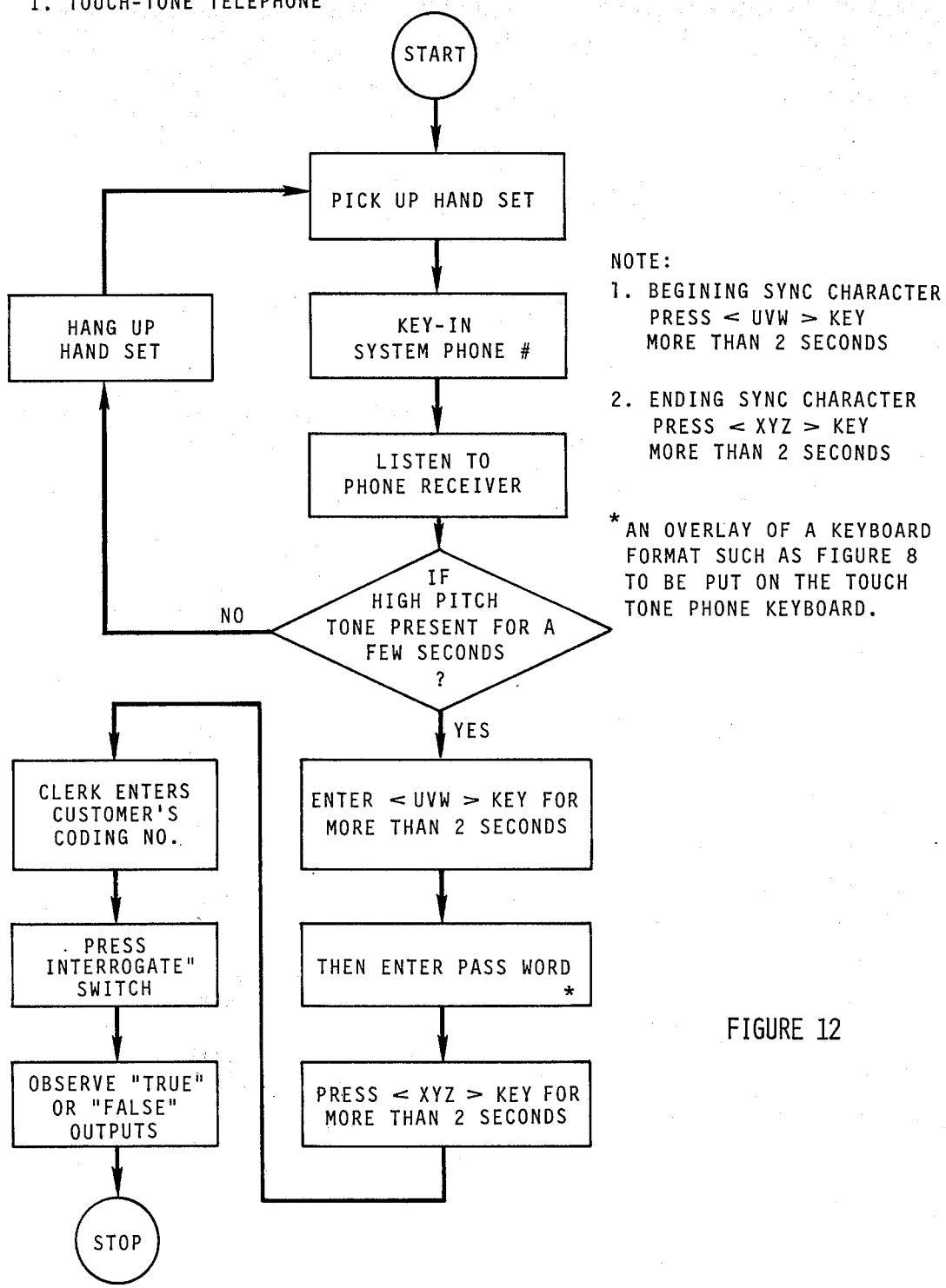
FIG. 12 is a logic program flow chart for a telephone operated verification machine of FIGS. 6–11.

Referring now to FIG. 12 there is shown the program logic flow chart for a verification machine for verifying a person's identify over a telephone line. The system uses the verification machine 45 of FIG. 10a and b with slight modifications. The modifications include a telephone patch for patching the telephone to the verification machine 45 such that the dial or touch tone keyboard of the telephone may be employed as a substitute for the 12 position keyboard 2 in the verification machine 45. Also special tones, of a duration of 2 seconds or more are utilized to actuate the interrogate switch 25 of the verification machines to switch the operating state of the verification machine between the three operating states, namely, customer entry, clerk entry, and display states.

To start the verification phase, which normally could follow the order of merchandise, stock or the like, the person wishing to verify himself picks up the hand set from the telephone and dials in a number which will patch his telephone into the verification machine. The customer listens to the phone receiver and if the connection is made to the verification machine a high pitch tone is present for a few seconds and the verification machine 45 is now linked by telephone lines to the customer.

The customer then depresses one of the keys on the keyboard of the telephone, such as the UVW, key for more than two seconds. This tone is picked up by a detector in the verification machine 45 and causes the verification machine to assume the first operating state, namely, the customer entry state. The customer then keys in his password. If the touch tone keyboard of the telephone does not utilize the same key format as that of the verification machine 45, an overlaying keyboard format may be supplied to the customer for this purpose.

After the customer has keyed in his password, he presses a second key for more than two seconds, for example, he depresses the XYZ key, thereby signaling the end of the password. When the telephone was patched into the verification machine the keyboard of the telephone was substituted for the keyboard of the verification machine by means of a simple switching network. Upon signaling the end of the password, the second tone actuates the modulus 3 counter 53 to switch the decoder 54 to the second operating system state, namely, the clerk entry state. The clerk then enters via his own keyboard on the verification machine 45 the customer's code number. Upon completion of the clerks entry of the customer's code number, the clerk presses the interrogate switch 25 to switch the verification machine into the third operating state, namely, the display state. The clerk then observes whether there was a true match between the customer's code number and the customer entered password. If he obtains a true match, the person has properly verified himself over the telephone and the clerk may honor his order. The clerk then depresses the interrogate switch and switches the verification machine 45 into the customer entry state.

Figure 13:
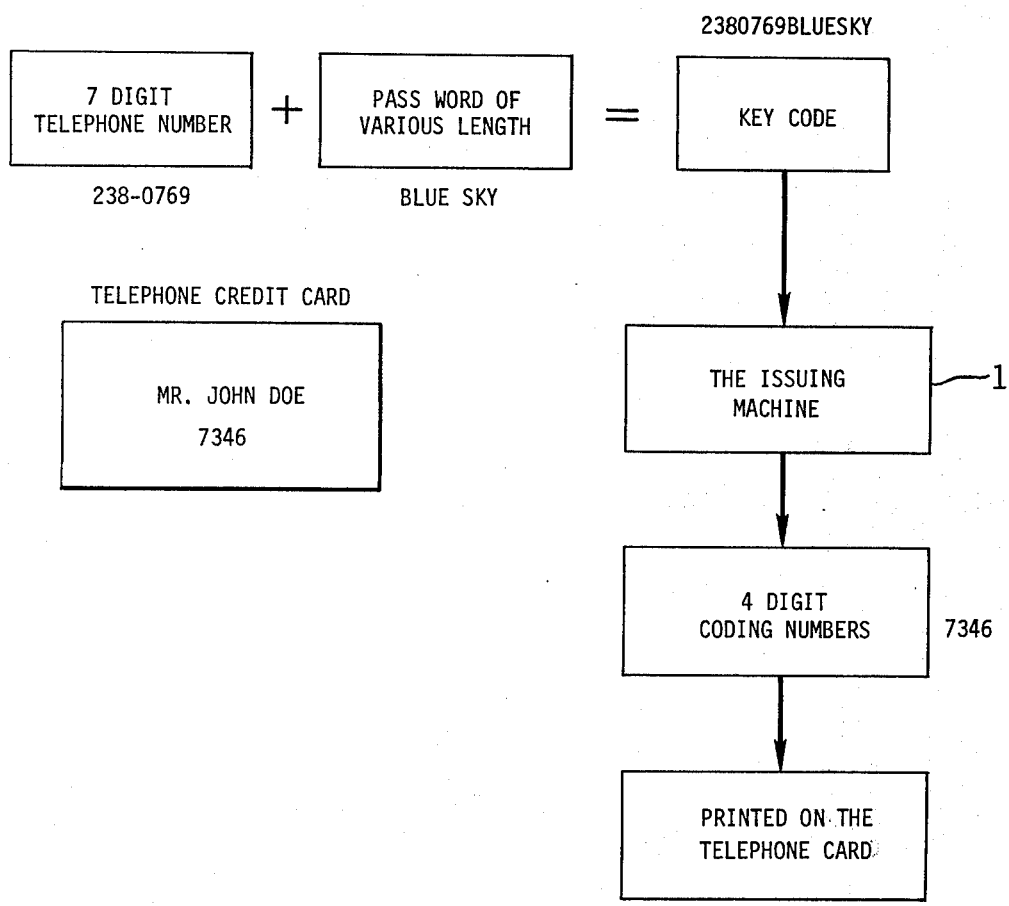
FIG. 13 is a schematic block diagram of a code word issue machine for issuing a code word for a telephone credit card user.

Referring now to FIG. 13, there is shown a logic flow chart for an encoding scheme for issuing a telephone credit card number to a customer in response to the customer's desired password. More particularly, the customer combines his 7-digit telephone number with a desired password, such as "bluesky" to obtain the combined password. The password is then inputted into the code word issue machine 1 of FIG. 1 to issue the credit card code word, such as 7346. This code word is then printed on the telephone credit card. The telephone number of the customer may also be printed on the telephone credit card. However, the customer's password, such as "bluesky" is not printed on the card but retained in his memory.

Figure 14:
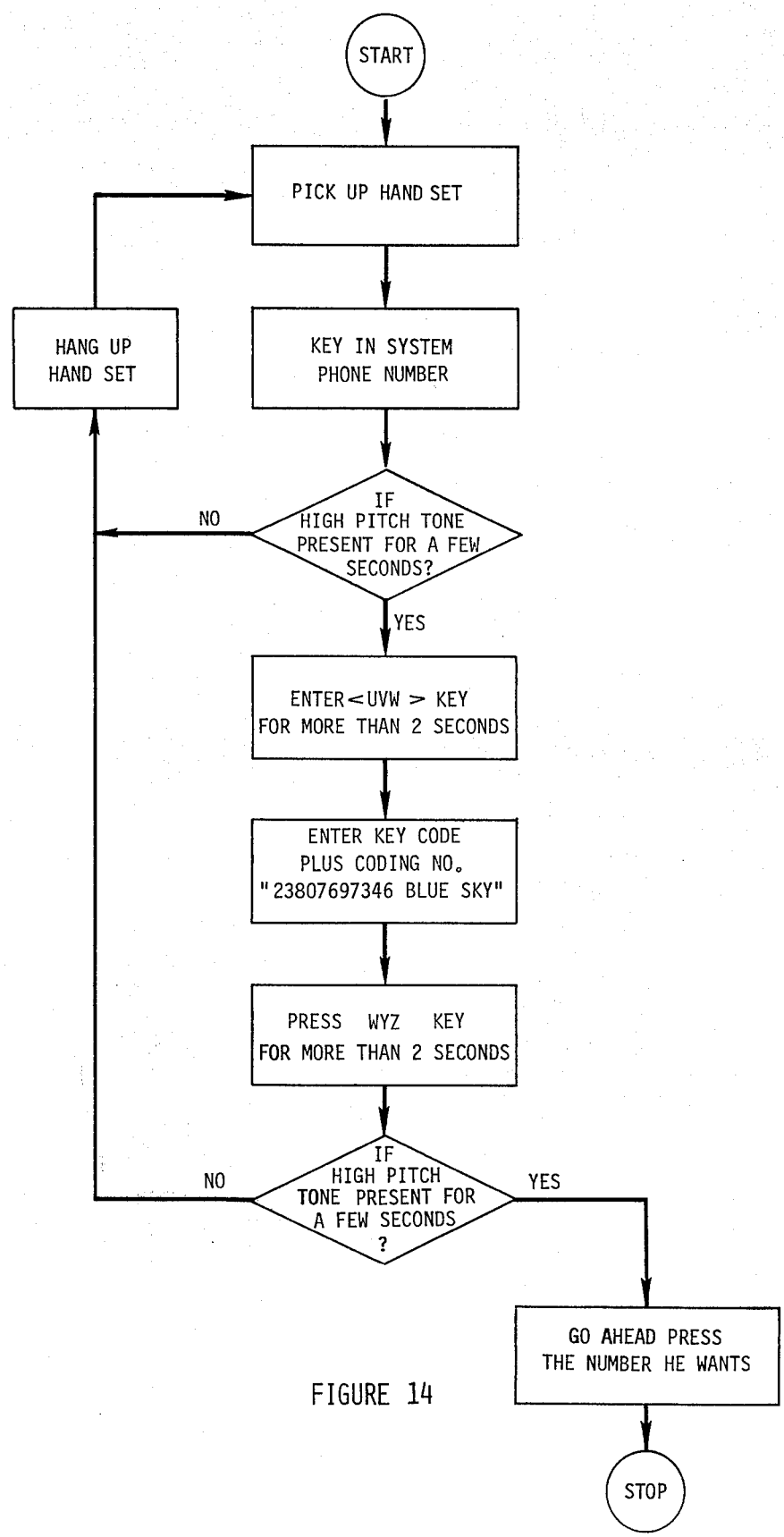
FIG. 14 is a logic program flow chart for verifying a telephone credit card call and employing a verification machine of FIGS. 6–11.
Figure 15:
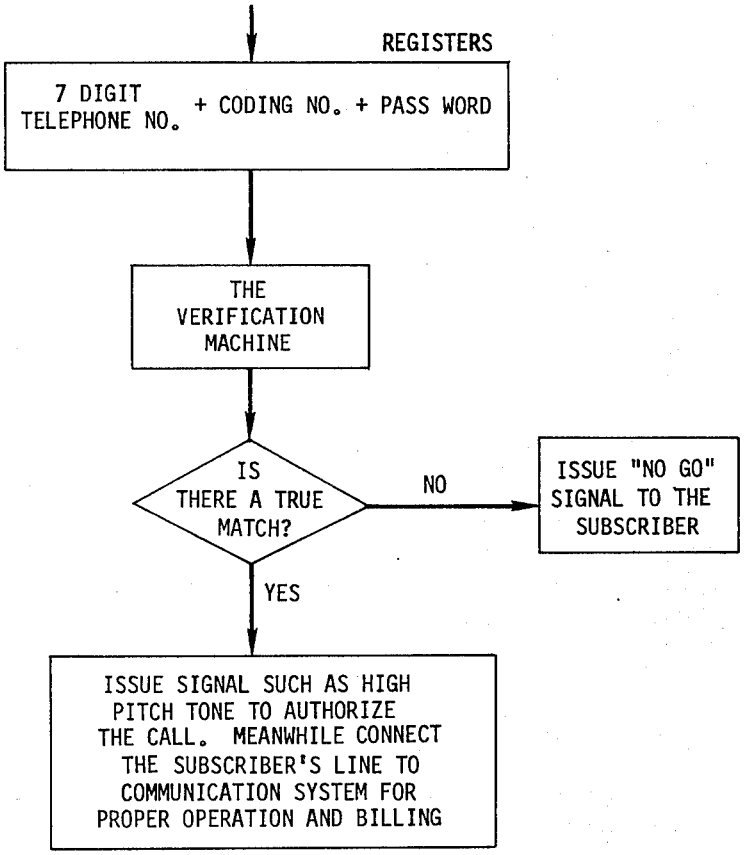
FIG. 15 is a logic program flow chart for caller verification at the central telephone office.

Referring now to FIG. 14 there is shown the program logic flow chart for placing a credit card call. To place the call, the subscriber picks up the hand set and dials in a certain phone number to patch his telephone into a storage register in a telephone central office system as shown in FIG. 15. When he has patched into the registers of the central office, he obtains a high pitch tone and then he can start to enter his password, code word, and phone number. He first generates a beginning synchronizing character, such as by pressing the UVW key of a touch tone system for more than 2 seconds. This is picked up in the central office and actuates a switching circuit in the central office to store the first password in a password register. The subscriber then dials in the password and it is entered in the password register. After dialing the last character of his password, he again actuates the ending synchronizing character which maybe the same UVW key for more than 2 seconds. This is picked up in the central office and switched into the telephone line at the central office the telephone number storage register. The subscriber then dials in his 7-digit user's telephone number. After entry of the telephone number, he again actuates an ending synchronizing character by pressing the UVW key for more than 2 seconds. This is detected at the central office and switches the user's telephone into the code number register. The subscriber then dials in the code number.

After dialing in the code number, the subscriber presses the ending synchronizing character key such as the XYZ key for more than two seconds. This then activates the central office equipment to read out the password and 7-digit telephone number into the verification machine 45. After reading out the password and telephone number into the verification machine the equipment at the telephone central office reads out the code number by the signal routing control 46 into the comparator 47 for comparison with the output of the 24-bit shift register 22 to derive a true or false output. If a true output is obtained, the central office equipment issues a signal, such as a high pitch tone to authorize the call. It also connects the subscribers line to a communication system for proper operation and billing. If a false indication is obtained from the verification machine 45, the central office euqipment issues a no-go signal to the subscriber. Assuming that a true verification signal was obtained the switching equipment transfers the customer's 7-digit telephone number and code number from the corresponding register storage into the billing machine for proper billing of the customer.

Figure 16:
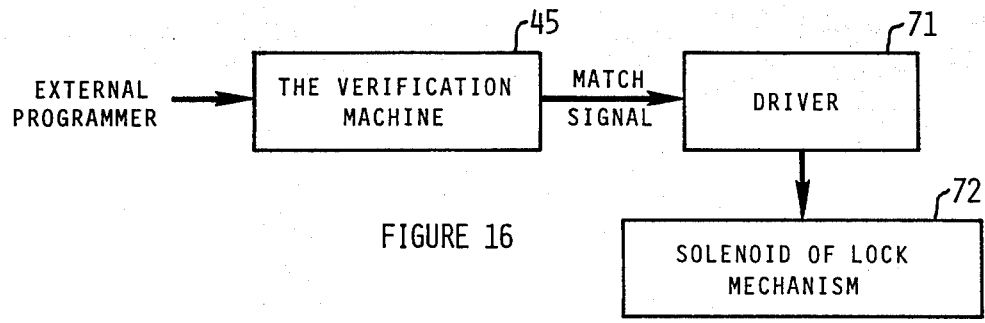
FIG. 16 is a schematic diagram, in block diagram form, of a lock incorporating the verification machine of the present invention.
Figure 17:
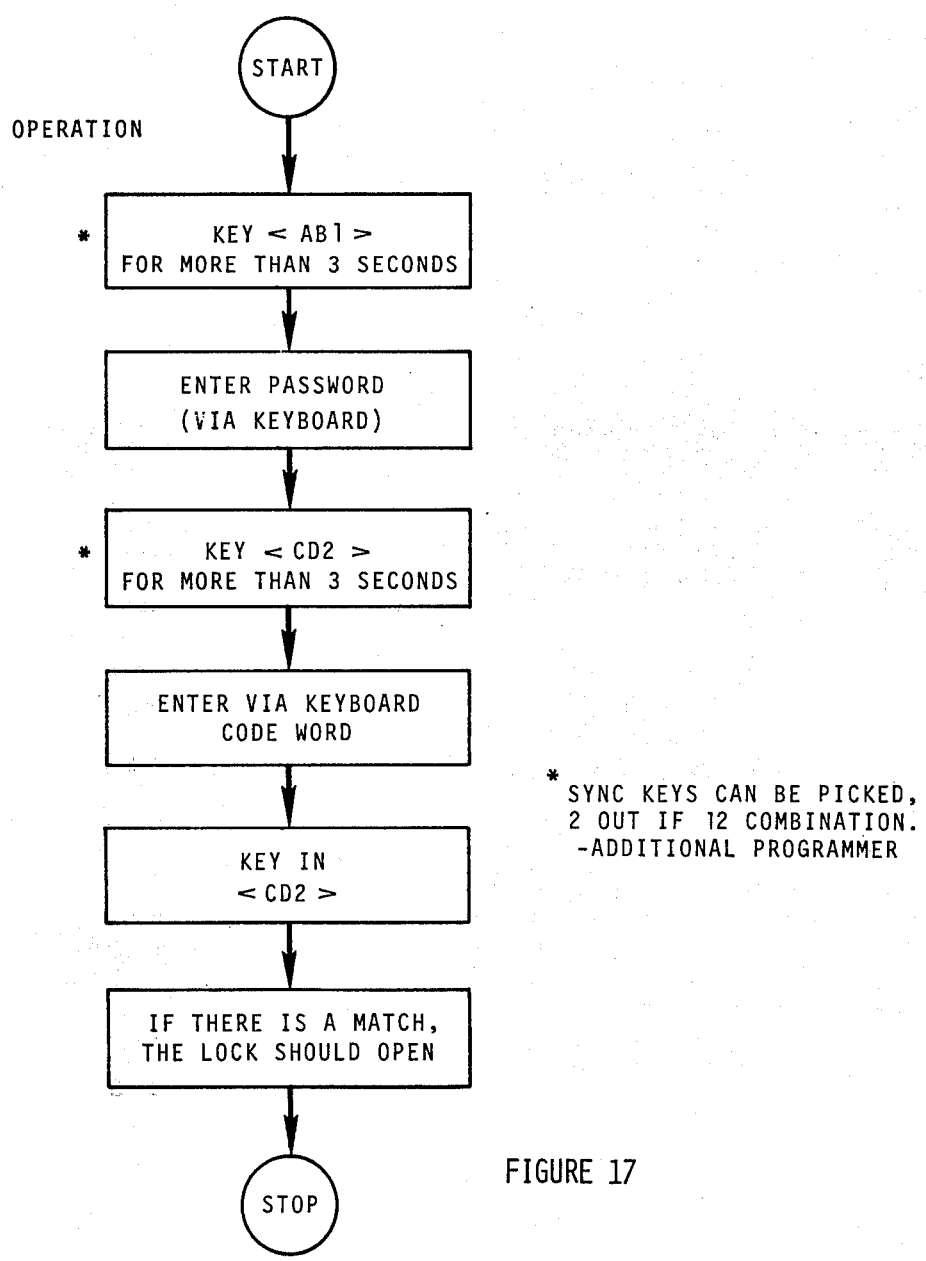
FIG. 17 is a logic program flow chart for the lock of FIG. 16.

Referring now to FIGS. 16 and 17, there is shown a lock and logic program flow chart therefor employing features of the present invention. More particularly, the verification machine 45 has its true output fed to the input of a driver 71 which drives a solenoid 72 of a lock mechanism. In operation, the person seeking entry to a locked region depresses one of the keys of the keyboard for more than three seconds or, in the case of the verification machine 45, depresses the interrogate switch 25. The operator then enters his password via the keyboard 2. He then depresses the interrogate switch 25 for switching to the second state and enters his code word. He then depresses the synchronizing key or interrogate switch 25 to obtain a comparison between the encoded password and the code word, if there is a truth match then the output is fed to the driver 71 for releasing the solenoid of the lock.

In some cases, it may be desirable to maintain a log of persons unlocking the lock and including on the log the time of entry. Accordingly, referring now to FIG. 10, page 1, the verification machine 45 is modified to include a recorder. More particularly, a delay 73 is connected to the third output line of the decoder 54 for delaying the output signals derived on the third line and indicative of a shift to the third or display state. This delay may be on the order of a few seconds in order to allow time for the display to indicate a true or false match and, in the case of a lock, to allow the solenoid to operate and the operator to enter the locked region.

On termination of the delay period the output of the delay 73 is fed to one input of a gate 74 for gating at least 24 clock pulses derived from the clock generator 21 into the 24-bit shift register 22 for shifting the contents of the shift register in a serial manner out of the shift register 22 into a digital recorder and clock recorder 75. The time recording function of the recorder 75 may be obtained by a digital clock incorporated in the recorder thereon. The recording medium is advanced by a clock mechanism. The binary output of the 24-bit shift register 22 is serially recorded on the recording medium and can later be decoded and read out to obtain the code number for the person gaining entry as well as the time of entry.

Figure 18:
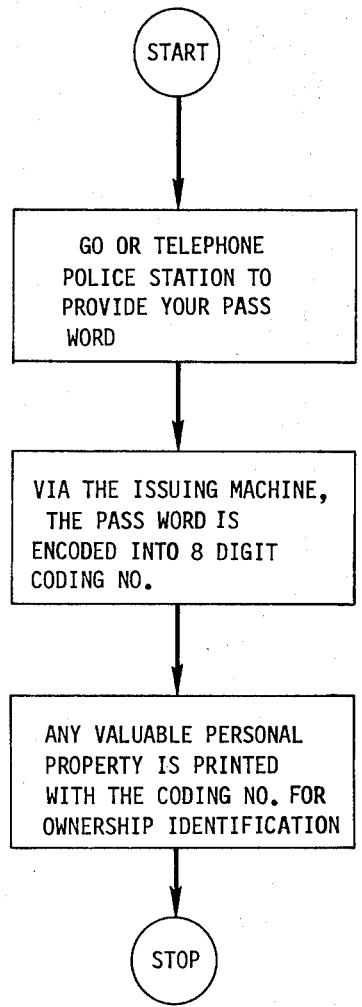
FIG. 18 is a logic program flow chart for a scheme for identification of property with a code word.
Figure 19:
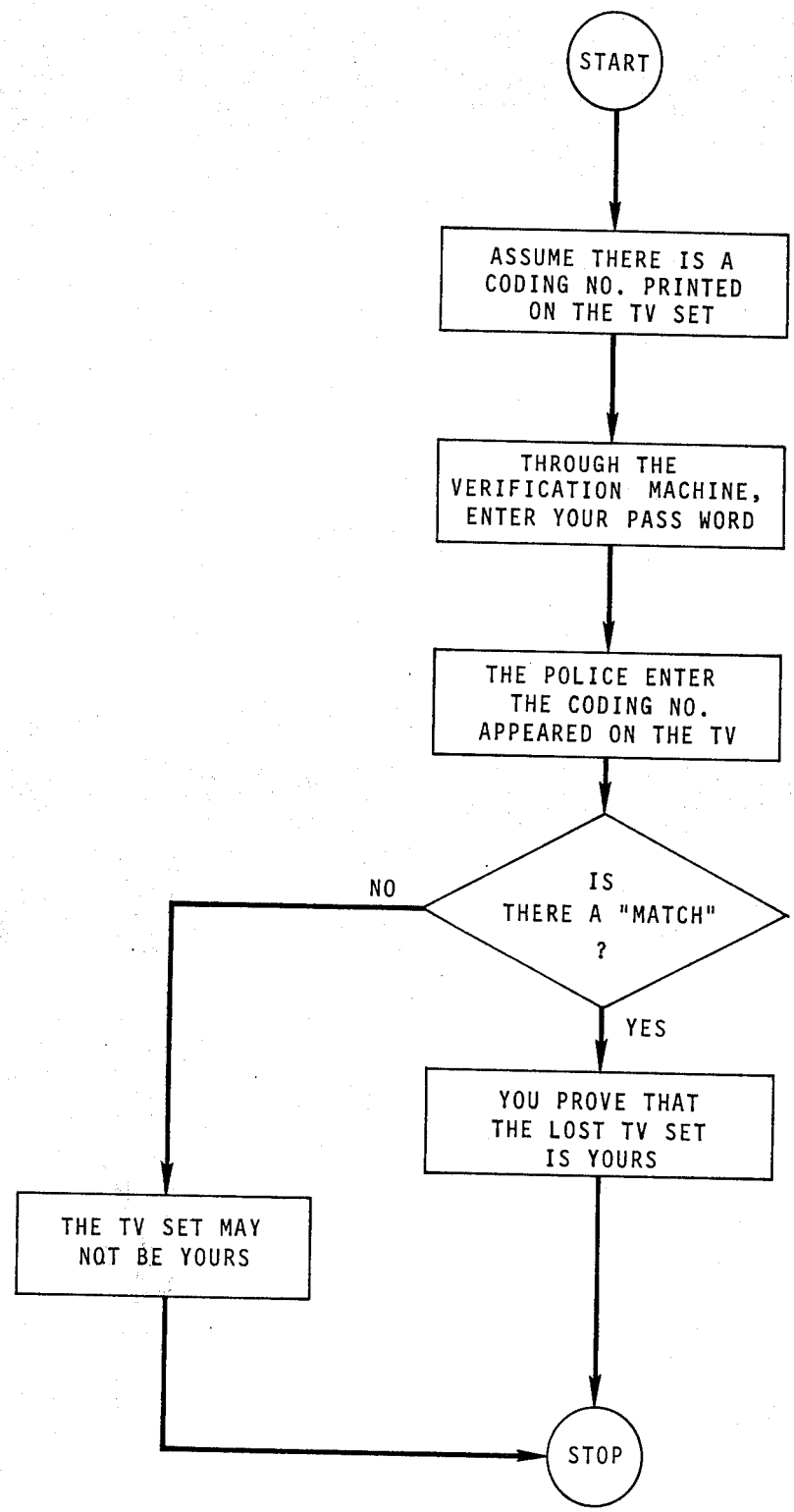
FIG. 19 is a logic program flow chart for verifying ownership of property marked with an issued code number.

Referring now to FIGS. 18 and 19 there is shown a scheme for verifying the ownership of property. Referring now to FIG. 18 a code number is issued to the property owner by having the owner go to the police station or by telephoning the police station and providing his password. The password is manually entered into a code word issue machine 1 and the code word is issued to the property owner. The property owner then marks his property with the code number.

Once the lost property has been located, ownership is verified through use of a verification machine 45 as shown in FIG. 19. More particularly, the owner of the property enters his password in the verification machine 45. The police enters the coding word appearing on the property. If there is a true match this verifies the ownership of the property, if ther is a false match there is an indication that this property does not belong to the purported owner.

What is claimed is:

1. The method of operating a personal verification system including encoding means and code word input means coupled to the encoding means for verifying the authority of an individual to complete transactions on the basis of the combination of an individual code word which is peculiar to the individual, a secret code word which need only be known to the individual and a compiled code word which is derived from the other of the code words, the method comprising the steps, performed in selected sequence, of:

preparing a logical encoding status in accordance with a selected logical combination of both the individual code word and a secret code word received from the individual prior to verification of his authority to complete a transaction;

encoding the combination of both the individual code word and the secret code word received from the individual in accordance with said logical encoding status to produce a compiled code word therefrom;

preparing a record of said compiled code word for subsequent use in verifying the authority of the individual to complete a transaction;

applying to the code word input means of the system both an individual code word for identifying the individual attempting to complete a transaction and a secret code word from such individual;

preparing a logical encoding status in the encoding means of the system in accordance with said logical combination of both the individual code word and secret code word applied to the code word input means of the system;

encoding the combination of both the individual code word and the secret code word applied to the code word input means in accordance with said logical encoding status prepared in the encoding means of the system to produce a corresponding compiled code word therefrom;

comparing said corresponding compiled code word with the compiled code word from said record for the authorized individual having such individual code word; and controlling completion of the transaction in response to the comparison of the compiled code word from said record with said corresponding compiled code word produced from the applied individual code word and secret code word received from the individual attempting to complete the transaction.

2. The method according to claim 1 wherein in the steps of encoding, the individual's code word and secret code word are encoded without disclosure to other persons.

3. The method according to claim 1 wherein said step of preparing the record includes supplying the compiled code word to the authorized individual; and including the step of:

applying such individual's compiled code word to the code word input means in the course of attempting to complete a transaction; and said step of controlling completion of the transaction is performed in response to the comparison of the compiled code word introduced from the record of such individual with said corresponding compiled code word produced by the encoding means from the secret code word and individual code word received from the individual.

4. The method according to claim 3 for consummating a credit transaction wherein:

said steps of preparing a logical encoding status includes in the same selected sequence:

introducing the individual's code word introducing the individual's secret word; and including the step of:

applying the individual's compiled code word to the code word input means;

for performing in selected sequence said steps of:

producing said corresponding compiled code word in the encoder means for comparison with the compiled code word entered on behalf of the individual; and controlling consummation of said credit transaction and debiting therefor the individual identified by said individual code word in response to said comparison.

5. The method of verifying the authority of an individual to complete a credit transaction according to claim 4 using the digit-entry switching means of a telephone as the code word input means, wherein the steps of entering the individual's code word, the individual's secret code word and the compiled code word include manually manipulating the digit-entry switching means of a telephone in selected sequence; and in the step of comparing, the corresponding compiled code word which is produced by the encoding means from the code word and the secret code word entered on behalf of the individual is checked for parity with the compiled code word entered on behalf of the individual as an indication of the authority of the individual to complete the attempted credit transaction.

6. Apparatus for verifying the authority of an individual to complete a transaction on the basis of logical manipulation of an individual's identifying code word, his secret code word and an encoded word logically derived from at least one of such code words, the apparatus comprising:

encoding means providing a variable encoding operation which is a function of the logical combination of a pair of code words applied thereto for producing an encoded word therefrom in accordance with said encoding operation which is also determined by said pair of code words;

input means coupled to said encoding means for applying thereto an individual's identifying code word and the individual's secret code word as said pair of code words during the course of a transaction for providing said encoding operation therefrom in accordance with said logical combination of the applied individual's identifying code word and secret code word, said encoding means producing said encoded word in accordance with said encoding operation from the applied individual's identifying code word and secret code word;

means providing an encoded word prepared by encoding the combination of the authorized individual's identifying code word and secret code word in accordance with a variable encoding operation which is determined by said logical combination of the authorized individual's identifying code word and secret code word; and means for comparing said encoded word prepared for the authorized individual with the encoded word produced during the course of a transaction to complete the transaction with respect to said individual's identifying code word in response to comparison of said encoded words.

7. Apparatus as in claim 6 wherein said input means further includes means for applying said individual's identifying code word to said encoding means in the same selected sequence with respect to input of the individual's secret code word to produce said encoding operation and encoded word therefrom as the sequence by which the encoding operation and encoded word were prepared from the combination of the authorized individual's identifying code word and secret code word.

* * * * *